United States Patent [19]

Heilesen

[11] Patent Number: 5,501,031
[45] Date of Patent: Mar. 26, 1996

[54] MOUSE TRAP

[75] Inventor: Joergen Heilesen, Tommerup, Denmark

[73] Assignee: Erik Molgaard, Svendborg, Denmark

[21] Appl. No.: 211,582

[22] PCT Filed: Oct. 7, 1992

[86] PCT No.: PCT/DK92/00294

§ 371 Date: Apr. 20, 1994

§ 102(e) Date: Apr. 20, 1994

[87] PCT Pub. No.: WO93/06722

PCT Pub. Date: Apr. 15, 1993

[30] Foreign Application Priority Data

Oct. 10, 1991 [DK] Denmark ................. 1723/91

[51] Int. Cl.$^6$ ................................. A01M 23/30
[52] U.S. Cl. ................................. 43/78; 43/61
[58] Field of Search ................. 43/61, 77, 78, 43/85

[56] References Cited

U.S. PATENT DOCUMENTS

| | | | |
|---|---|---|---|
| 2,148,813 | 2/1939 | Hosmer | 43/78 |
| 2,603,029 | 7/1952 | Anderson | 43/85 |
| 3,362,100 | 1/1968 | Winkler | 43/78 |
| 4,766,692 | 8/1988 | Shurden | 43/61 |

FOREIGN PATENT DOCUMENTS

| | | | |
|---|---|---|---|
| 565079 | 11/1923 | France | 43/78 |
| 97945 | 9/1924 | Germany | 43/78 |
| 48042 | 7/1909 | Switzerland | 43/78 |
| 6537 | 12/1894 | United Kingdom | 43/78 |

*Primary Examiner*—Kurt Rowan
*Attorney, Agent, or Firm*—McAulay Fisher Nissen Goldberg & Kiel

[57] ABSTRACT

A trap for mice or the like animal comprises a spring-loaded displacement member (17) supported by a frame (10) with an opening for receiving the head of the animal. The displacement member (17) is connected to the frame (10) by means of a securing line (27) extending within reach of the animal in the frame (10) inside the opening (22). The frame (10) is formed in one piece and comprises a front wall (12), in which the opening is placed and on the outside of which the displacement member (17) is arranged so as to be displaceable transverse to the opening (22). The displacement member (17) is spring-loaded by means of rubber bands (25 and 26) fastened to the frame (10) and protected on the front side of the front wall (12) by covering parts (15 and 16) formed integral with the frame. The frame (10) with the displacement member (17) is loosely placeable in a surrounding box with a closed rear wall, the opening (22) of the frame (10) facing an opening in the box.

14 Claims, 3 Drawing Sheets

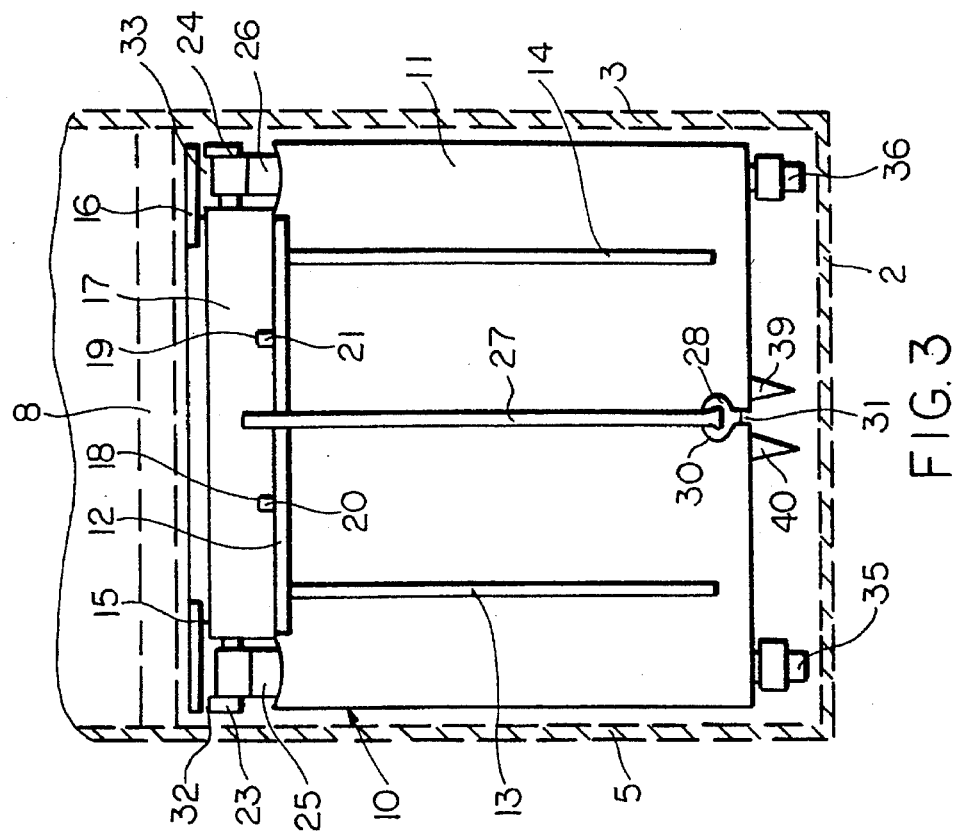
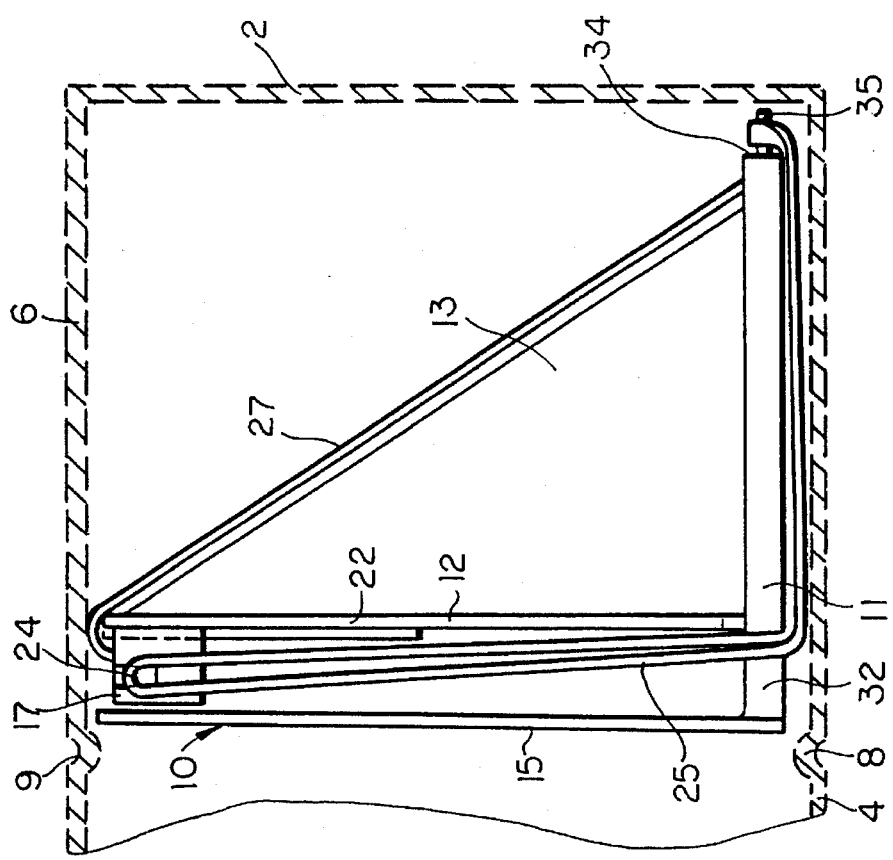

MOUSE TRAP

TECHNICAL FIELD

The invention relates to a trap for mice or the like animal and comprising a spring-loaded, releasable displacement member supported by a frame with an opening for the receiving of the head of the animal, said displacement member being connected to the frame by means of a securing line extending within reach for the animal in the frame inside the opening.

BACKGROUND ART

Traps of the above type are known which involve a difficult and to some persons a repulsive operation in removing the killed animal and resetting the trap. Other traps are relatively difficult to clean and hit the animal rather arbitrarily and sometimes with the effect that the animal is not killed instantaneously. At worst, the animal is not killed at all.

DESCRIPTION OF THE INVENTION

The object of the invention is to provide a trap operating in a reliable manner while simultaneously being inexpensive to manufacture, whereby it is suited as a trap being disposable with the dead animal.

The trap according to the invention is characterised in that the frame is formed in one piece and comprises a front wall, in which the opening is placed and on the outside of which the displacement member is arranged so as to be displaceable transverse to the opening, that the displacement member is spring-loaded by means of rubber bands or elastic bands fastened to the frame and protected on the front side of the front wall by covering parts formed integral with the frame, and that the frame with the displacement member is loosely placeable in a surrounding box with a closed rear wall, the opening of the frame facing an opening in the box.

Such a trap is easy to manufacture and to set, and the frame with the displacement member is arranged inside the box together with a suitable bait. When an animal has been trapped, the entire trap can, if desired, be destructed or removed together with the animal without involving substantial costs. On account of the opening for receiving the head of the animal and the ability of the displacement member to be displaced transverse to said opening when the animal gnaws the securing line in two in order to reach the bait, the animal is killed by an exact stroke breaking its nake instantaneously. A sufficiently strong stroke is ensured by a suitable choice of rubber bands.

A particularly simple embodiment of the displacement member is according to the invention ensured by said member being a straight bar of plastics with means for the fastening of the rubber bands at each end.

The displacement member may furthermore according to the invention be formed integral with the securing line, and means may be provided for fastening the free end of the securing line to the frame, whereby the displacement member is fastened to the frame in a particularly easy manner during the mounting procedure. In this connection it is particularly advantageous when the free end of the securing line according to the invention comprises an integrally formed expansion, and when the frame comprises a corresponding recess for the fastening of the securing line.

In order to facilitate the fastening of a bait, means may according to the invention be formed integral with the frame.

Guide rails may according to the invention be provided on the front wall of the frame, said guide rails engaging corresponding grooves in the displacement member. As a result it is ensured that the displacement member moves in the desired direction directly towards and transverse to the opening in the front wall.

According to the invention it is particularly preferred that the frame comprises a plane base plate supporting a front wall-forming plate-shaped member with plate-shaped supporting walls formed perpendicular to said plate-shaped member and arranged on the back of the front wall.

Moreover according to the invention grooves may be provided on the bottom side of the base plate for receiving the rubber bands, and projections for the fastening of the rubber bands may be formed integral with the end of the base plate opposite the front wall and at the ends of said grooves. As a result, the rubber bands are fastened in a particularly easy manner.

In addition according to the invention, the covering parts may be plate-shaped strips protruding upwardly in front of the front wall and being permanently connected to the base plate, whereby said covering parts are particularly easy to manufacture.

Finally according to the invention, the covering parts may form guides for the displacement member. In this manner it is ensured that the displacement member is always displaced in a direction parallel to the front wall.

BRIEF DESCRIPTION OF THE DRAWINGS

The invention is described in greater detail below with reference to the accompanying drawing, in which FIG. 2 is a side view of a preferred embodiment of a frame according to the invention with the associated parts ready for arrangement inside the box of FIG. 1 together with a suitable bait, FIG. 3 is a top view of the embodiment of FIG. 2 with the front wall of the frame facing upwards.

BEST MODE FOR CARRYING OUT THE INVENTION

Figure 1:
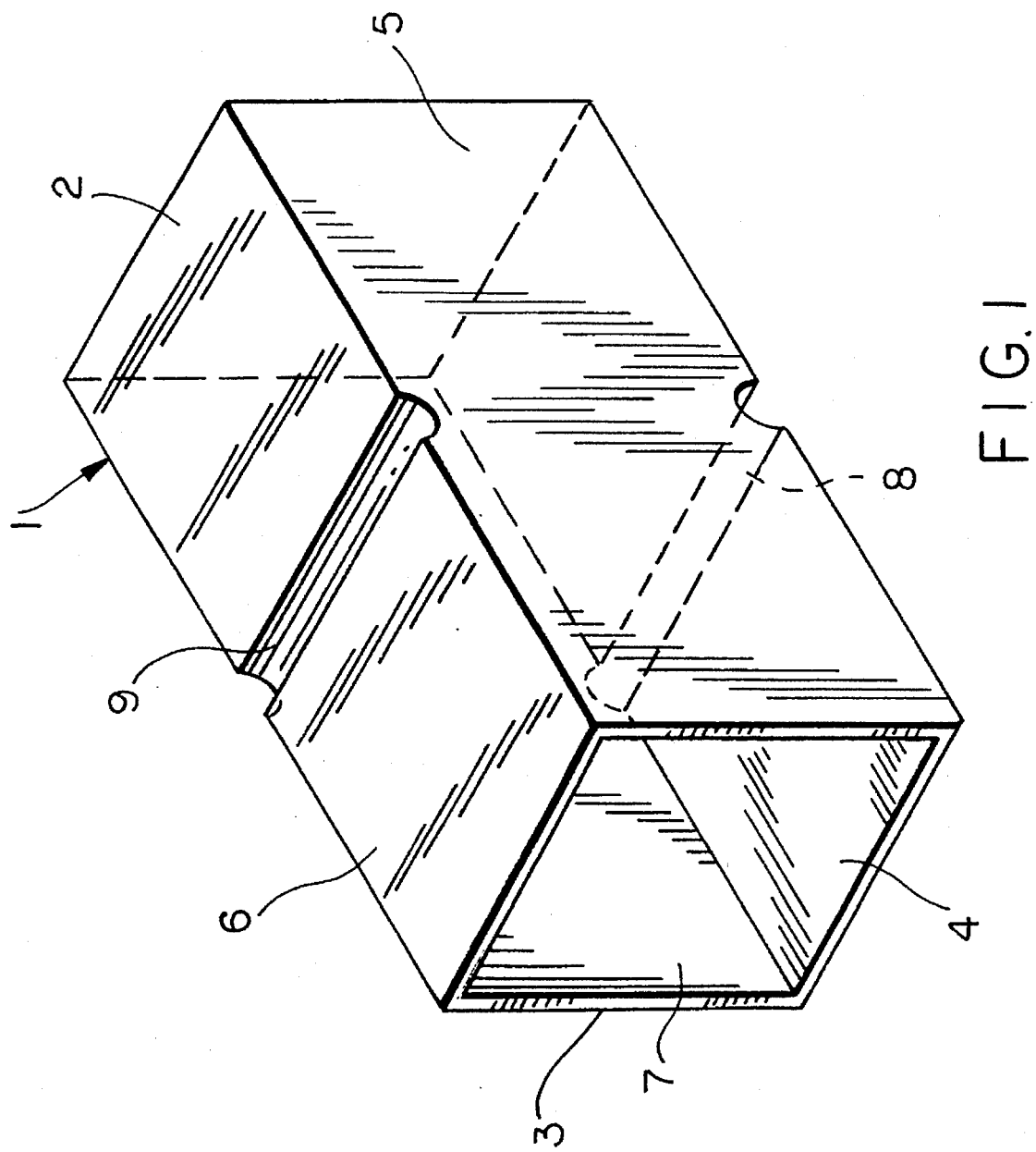
FIG. 1 is a perspective view of a preferred embodiment of a box presenting the surrounding part of the trap according to the invention.
Figure 5:
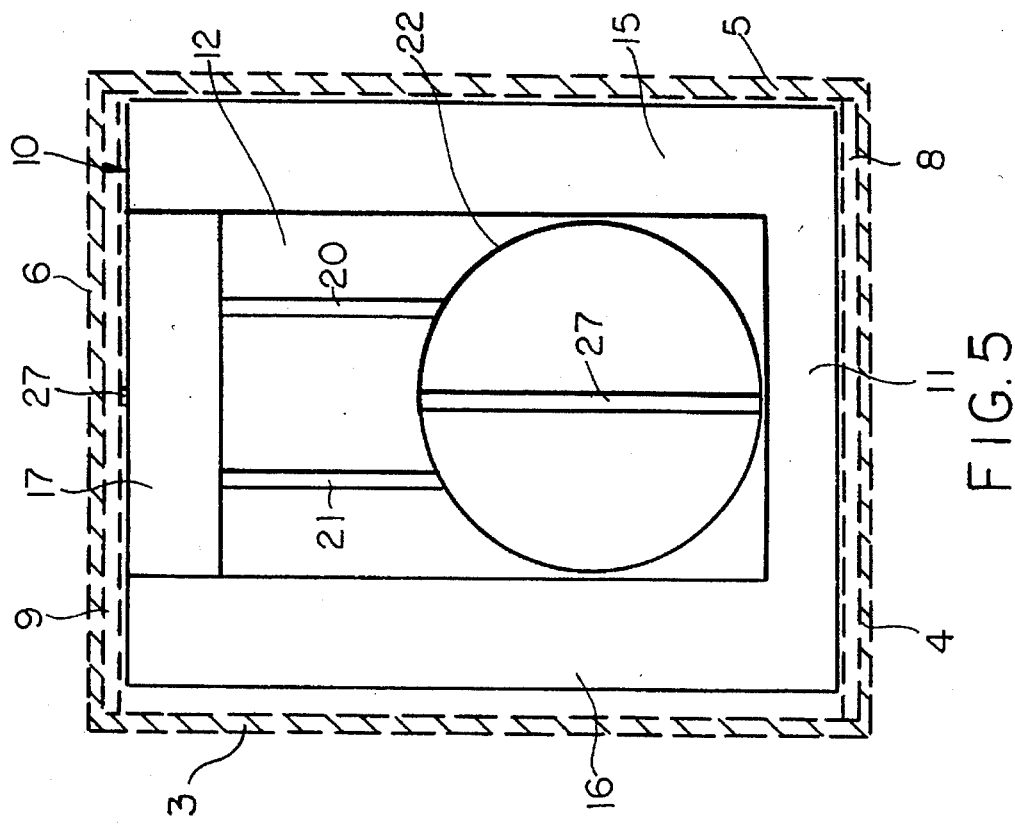
FIG. 5 is a front view of the embodiment of FIG. 2.

The box of FIG. 1 is designated the general reference numeral 1 and is formed with a closed bottom or end wall 2 and 4 and side walls 3, 4, 5, and 6. An opening 7 is provided opposite the bottom, the frame of FIGS. 2 to 5 being inserted through said opening into the box together with a suitable bait. Two opposing side walls 4 and 6 are shaped with ridges 8 and 9, respectively, facing towards the interior of the box 1 and ensuring that the frame and the associated parts remain inside the box in use. The box 1 is made of a suitable material, such as cardboard or pasteboard.

The frame of FIGS. 1 to 5 is designated the general reference numeral 10 and comprises a base plate 11, on which a plate-shaped front wall 12 is formed in one piece and extends substantially perpendicular to said base plate 11. On the back, the front wall is supported by two angular supporting walls 13 and 14 formed integral with both said front wall 12 and the base plate 11 and extending perpendicular thereto. Two cover strips 15 and 16 are provided parallel to and in front of the front wall, said strips also being formed integral with the base plate at each end of the front wall 12.

A bar 17 is displaceably arranged between the front wall 12 and the cover strips 15 and 16. The bar comprises two parallel guide tracks 18 and 19 on the side facing the front wall 12, said guide tracks engaging two parallel guide rails 20 and 21 shaped integral with the front wall and extending perpendicular to the base plate 11. The guide rails extend from the upper rim of the front wall 12 to an opening 22 in the front wall, of FIG. 5. The opening 22 is dimensioned to receive the animals, such as mice or rats, being the target of the trap. The opening is centrally arranged in the front wall 12 between the two cover strips 15 and 16.

The bar 17 is of a substantially square cross section in its entire length apart from its ends where it comprises projections 23 and 24, respectively, for the fastening of their respective rubber band or their respective elastic band 25 and 26.

The bar 17 is retained in the position shown in the drawing at the top of the front wall 12 above the opening 22 by means of a securing line 27 shaped integral with said bar 17. At the end opposite the bar 17, the securing line 27 comprises an expansion or a knob 28 received in a corresponding recess 29, of FIG. 4, on the bottom side of the base plate 11 at the end opposite the cover strips 15 and 16. The securing line extends from the recess 29 upwards to the upper side of the base plate through a through opening 30 and from here upwards to the bar 17. The opening 30 and the recess 29 are connected to the adjacent end of the base plate 11 through a slot 31 allowing a correct positioning of the line 27 with the expansion 29 received in the recess 29.

The rubber bands 25 and 26 extend from the bar 17 downwards along their respective side of the front wall 12 behind the cover strips 15 and 16 and through their respective recess 32 and 33, respectively, in the base plate 11. From here the rubber bands extend to the rear rim 34 of the base plate 11, where they are fastened to their respective projection 35 and 36, respectively, permanently provided on the base plate 11. The cover strips 15 and 16 protect the rubber bands against the attempts of the animals at gnawing them into two.

Figure 4:
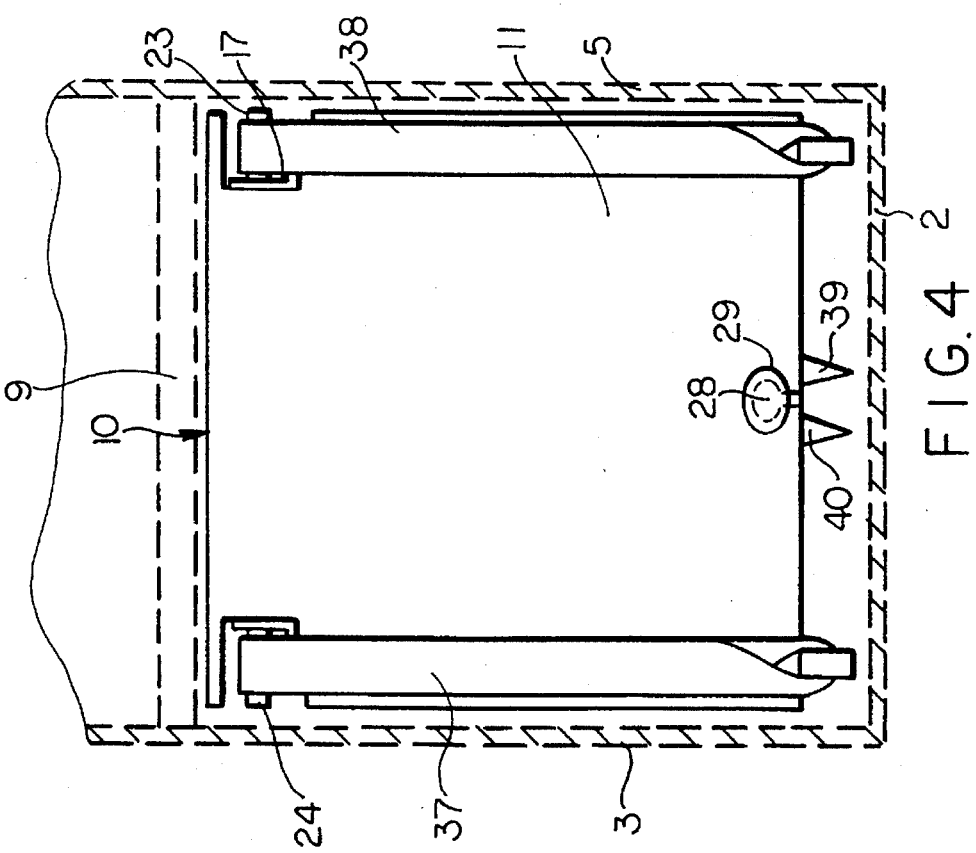
FIG. 4 is a bottom view of the embodiment of FIG. 2 also with the front wall facing upwards.

Grooves 37 and 38 may be shaped on the bottom side of the base plate 11, of the dotted lines in FIG. 4, for receiving the rubber bands 25 and 26. FIG. 4 shows the frame 10 without rubber bands.

Two pointed projections 39 and 40 are furthermore provided on the rear rim of the base plate 11 for fastening the bait.

The frame 10 and the bar 17 with the securing line are preferably made of a suitable plastic material and in a dimension matching the target animal of the trap. According to an embodiment for trapping mice, the frame is suitably of a height of 45 mm and a width of 43 mm. The opening 22 is of a diameter of about 20 mm. The box 1 is correspondingly dimensioned and of a length of 10 cm. The rubber bands are suitably made of natural rubber and are band-shaped of a width of 7 mm and a folded length of 35 mm, i.e. and endless band of a circumference of about 70 mm.

The frame 10 is easily set by the rubber bands 25 and 26 being fastened to the bar 17 and the projections 35 and 36, while the bar is placed at a level opposing the opening 22 between the front wall 12 and the cover strips 15 and 16.

Then the bar 17 is pulled upwards so as to level with the top surface of the front wall 12, where it is secured by the opposite end of the securing line being fastened in the recess 29 in the base plate 11. Now a suitable bait is placed on the pointed projections 28, and the ready frame is placed in the box 1. The animal is attracted by the bait and sticks its head through the opening 22 whereafter it gnaws the securing line 27 into two in order to reach the bait. When the line 27 is broken, the bar is pulled towards the neck of the animal by a force of about 3 kp with the result that the neck of the animal is broken instantaneously. The box and its contents can then be disposed or removed in another manner.

The invention has been explained with reference to a preferred embodiment. Many modifications can, however, be performed without thereby deviating from the scope of the invention.

I claim:

1. A trap for animals such as mice and rodents comprising a frame, a spring-loaded, releasable displacement member supported by the frame, the frame having a frame opening for receiving a head of an animal, said frame having a front wall, in which the frame opening is placed and on the outside of which the displacement member is arranged so as to be displaceable transverse to the frame opening, said displacement member being spring-loaded by means of resilient bands fastened to the frame, cover parts protecting the resilient bands located on the front side of the front wall, the cover parts formed integral with the frame, a surrounding box within which the frame with the displacement member is placeable, the surrounding box having a closed rear wall, and a box opening, the frame opening facing the box opening, the displacement member (17) being connected to the frame (10) by means of a securing line (27) which is extended to be within reach of the animal in the frame (10) inside the frame opening (22).

2. A trap as claimed in claim 1, wherein the displacement member (17) is formed integral with the securing line (27), and further comprising means for fastening the free end (28) of the securing line (27) to the frame (10).

3. A trap as claimed in claim 2 wherein the free end (28) of the securing line (27) comprises an integrally formed expansion, the frame having a corresponding recess (29) for fastening the securing line (27) thereto.

4. A trap as claimed in claim 1 further comprising means (39 and 40) for fastening bait within the frame (10).

5. A trap as claimed in claim 1 wherein the cover parts (15, 16) are plate-shaped strips which protrude upwardly in front of the front wall (12) and on both sides of the frame opening (22), the strips being connected to a base plate (11).

6. A trap as claimed in claim 5, wherein the cover parts (15, 16) form guides for the displacement member (17).

7. A trap as claimed in claim 2, characterized in that means (39 and 40) for fastening bait are formed integral with the frame (10).

8. A trap as claimed in claim 3, characterized in that means (39 and 40) for fastening bait are formed integral with the frame (10).

9. A trap as claimed in claim 2, characterized in that the cover parts (15, 16) are plate-shaped strips protruding upwardly in front of the front wall (12) and on both sides of the frame opening (22) and are permanently connected to a base plate (11).

10. A trap as claimed in claim 3, characterized in that the cover parts (15, 16) are plate-shaped strips protruding upwardly in front of the front wall (12) and on both sides of the frame opening (22) and are permanently connected to a base plate (11).

11. A trap as claimed in claim 4, characterized in that the cover parts (15, 16) are plate-shaped strips protruding upwardly in front of the front wall (12) and on both sides of the frame opening (22) and are permanently connected to a base plate (11).

12. A trap as claimed in claim 9, characterized in that the cover parts (15, 16) form guides for the displacement member (17).

13. A trap as claimed in claim 10, characterized in that the cover parts (15, 16) form guides for the displacement member (17).

14. A trap as claimed in claim 11, characterized in that the cover parts (15, 16) form guides for the displacement member (17).

* * * * *